United States Patent [19]

Sridhar

[11] Patent Number: 5,741,106
[45] Date of Patent: Apr. 21, 1998

[54] MATERIALS HANDLING SYSTEM

[75] Inventor: Sidney Sridhar, Richmond, Canada

[73] Assignee: Seabulk Systems Inc., Richmond, Canada

[21] Appl. No.: 569,047

[22] Filed: Dec. 7, 1995

Related U.S. Application Data

[63] Continuation-in-part of Ser. No. 759,931, Dec. 4, 1996, which is a continuation of Ser. No. 414,027, Mar. 31, 1995, abandoned.

[51] Int. Cl.$^6$ ...................................... B63B 27/22
[52] U.S. Cl. .................. 414/142.3; 198/532; 222/559
[58] Field of Search .......................... 198/531, 532; 222/545, 559, 561; 414/142.3, 306

[56] References Cited

U.S. PATENT DOCUMENTS

| | | | |
|---|---|---|---|
| 2,505,982 | 5/1950 | Meissner | 414/142.3 |
| 2,815,134 | 12/1957 | Borrowdale | 414/142.3 X |
| 3,191,998 | 6/1965 | Howlett | 414/142.3 X |
| 4,428,504 | 1/1984 | Bassett et al. | 222/545 X |
| 4,828,448 | 5/1989 | Skeath | 414/304 |

*Primary Examiner*—Janice L. Krizek
*Attorney, Agent, or Firm*—Elbie R. de Kock

[57] ABSTRACT

A materials handling system (30) for controlling the gravity discharge of material through a discharge opening (33) onto a conveyor (34) comprises a gate (40) extending across the discharge opening (33) and having a plurality of outlet openings (40.4) therein for the through flow of material from the discharge opening (33) through the gate (40). The gate (40) has closure members (71) for the outlet openings (40.4). First and second linkage members (71.4, 71.5) extend along the gate (40) and a power source (71.6, 71.7) for moving the linkage members (71.4, 71.5) relative to the gate (40) and independently of each other, is provided. Coupling members (71.8) for selectively coupling the closure members (71) to either one or the other of the linkage members (71.4, 71.5) is provided. In an another embodiment, a feeder deck (60) is provided below the gate (40). The feeder deck (60) has a materials receiving surface (61.5), corresponding with each outlet opening (40.4) in the gate (40). A scraper (61.8) for each materials receiving surface (61.5) is provided for moving material along the surface (61.5) to discharge the material onto the conveyor (34).

20 Claims, 20 Drawing Sheets

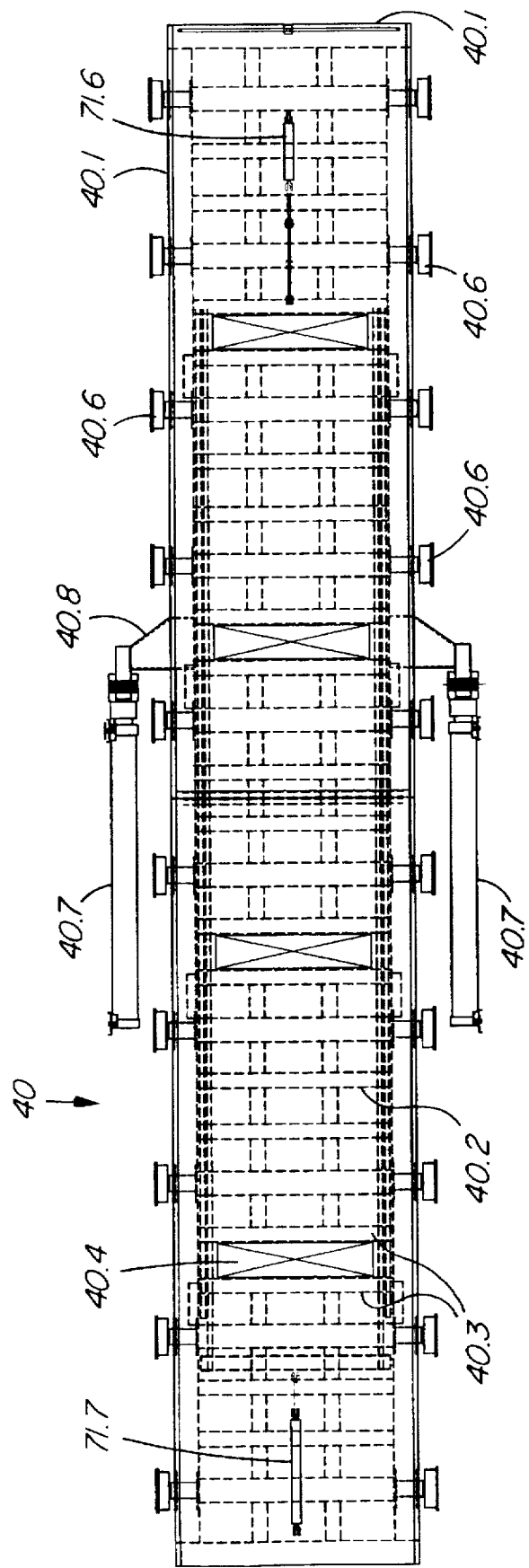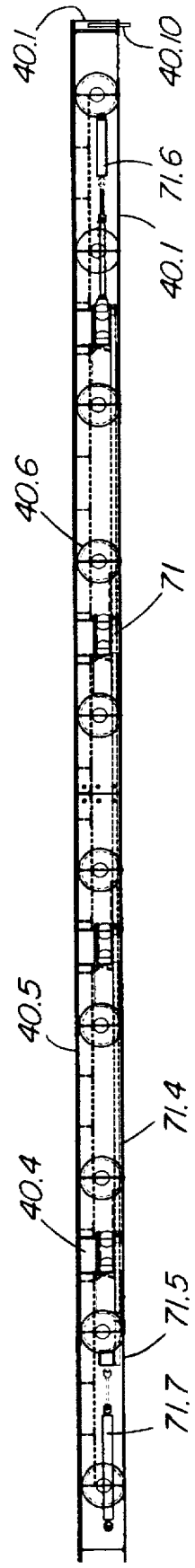
FIG. 5B
FIG. 5A

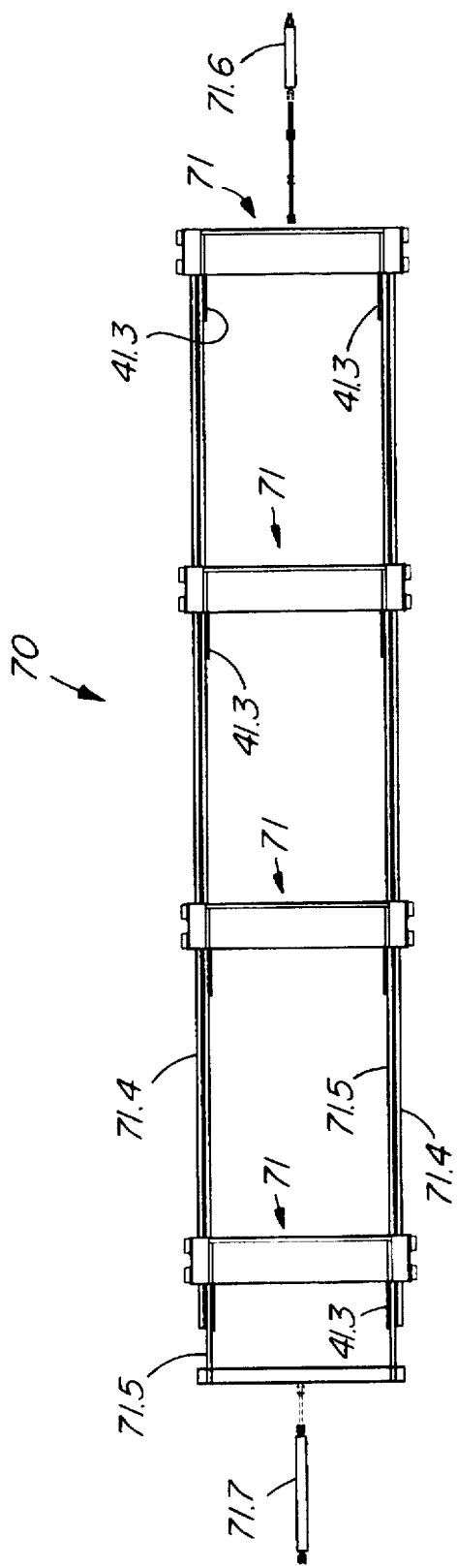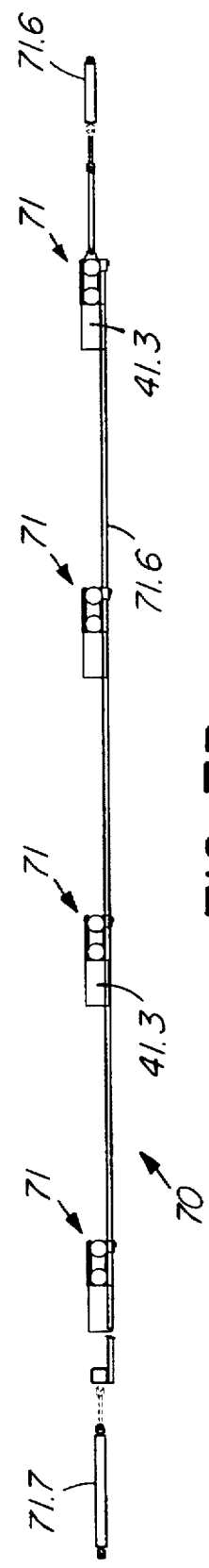
FIG. 7A
FIG. 7B

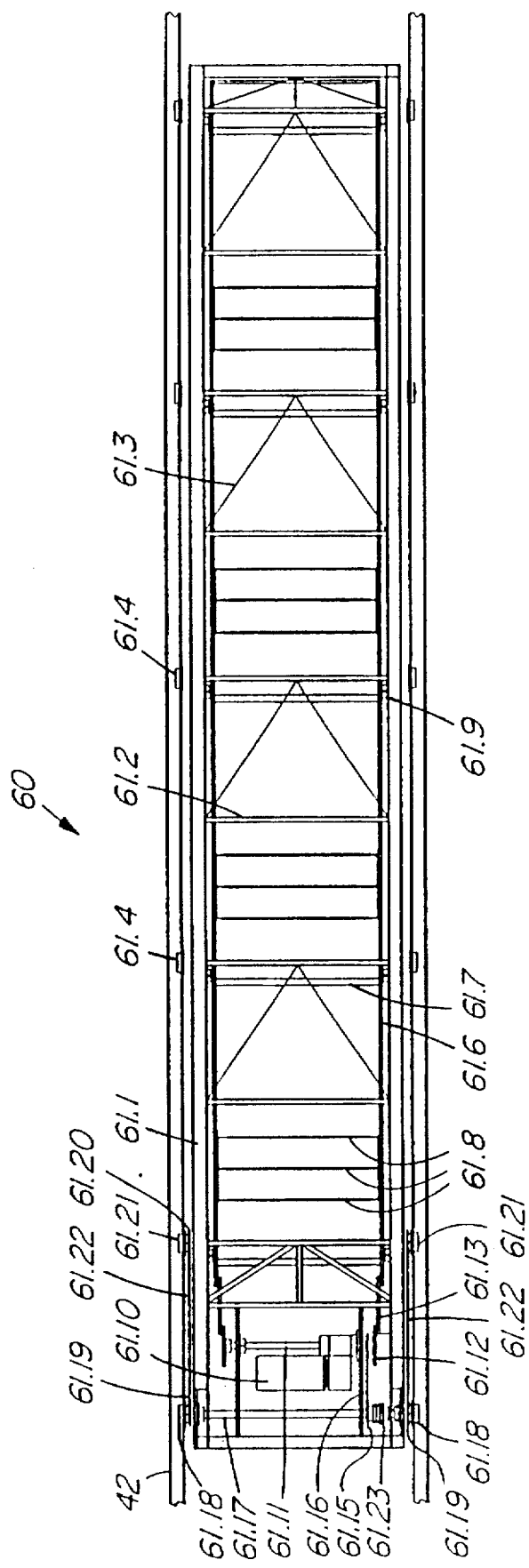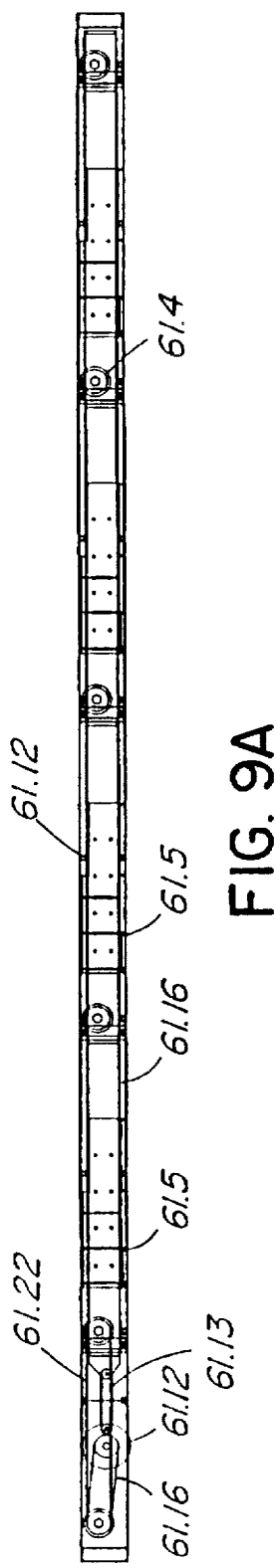

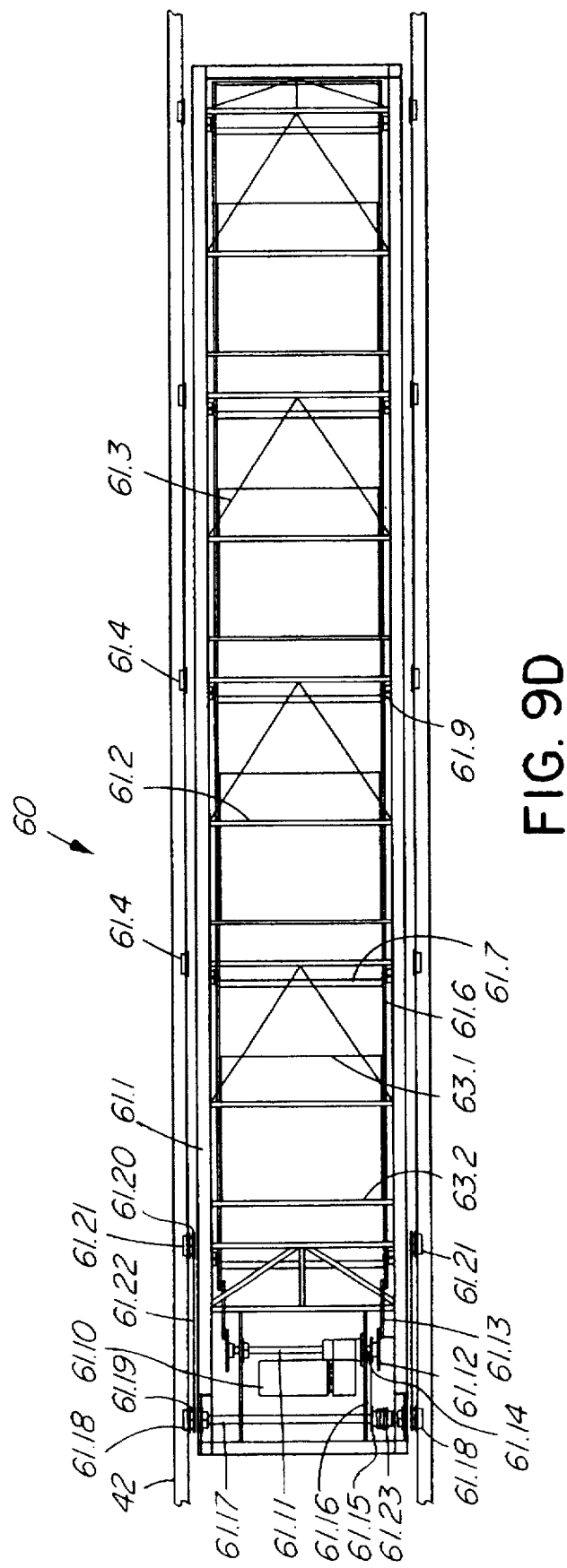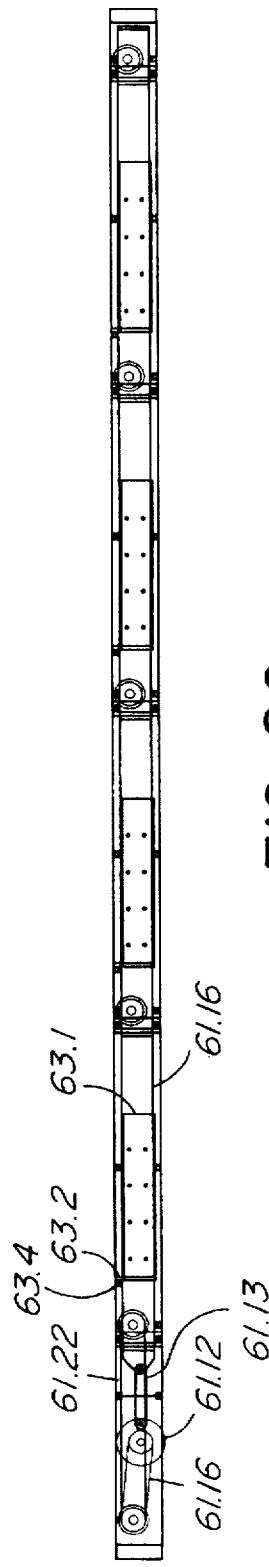
FIG. 9D
FIG. 9C

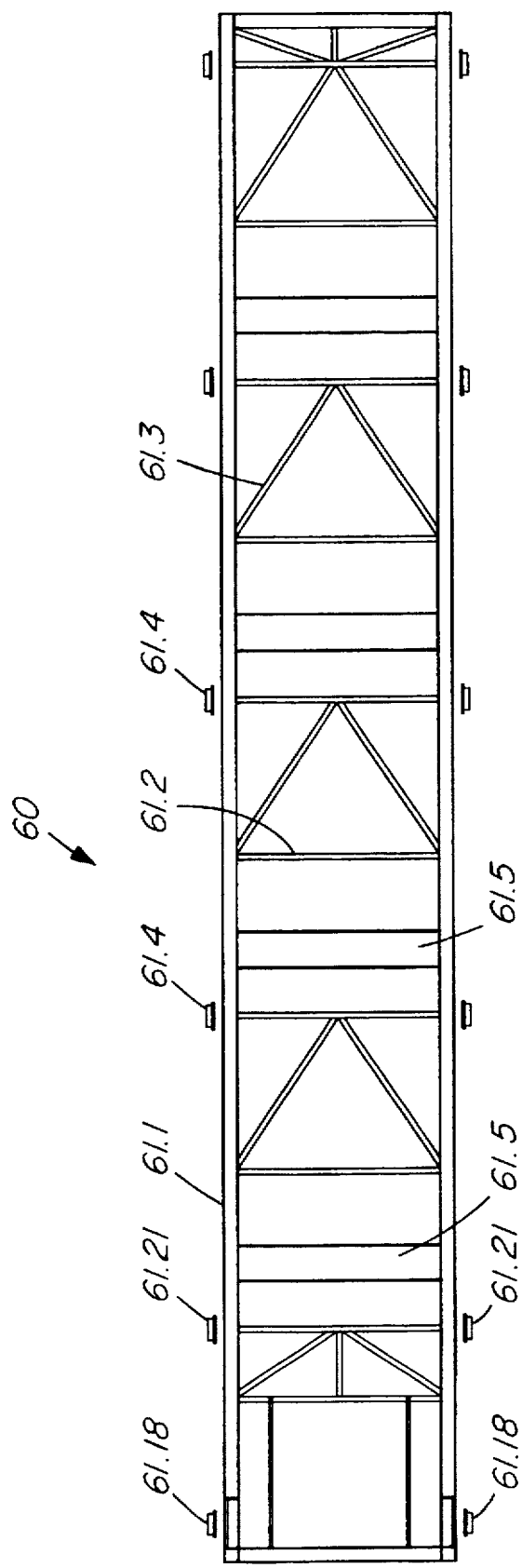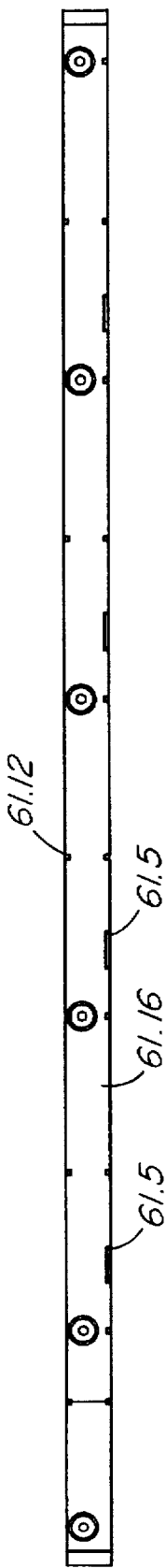
FIG. 10B
FIG. 10A

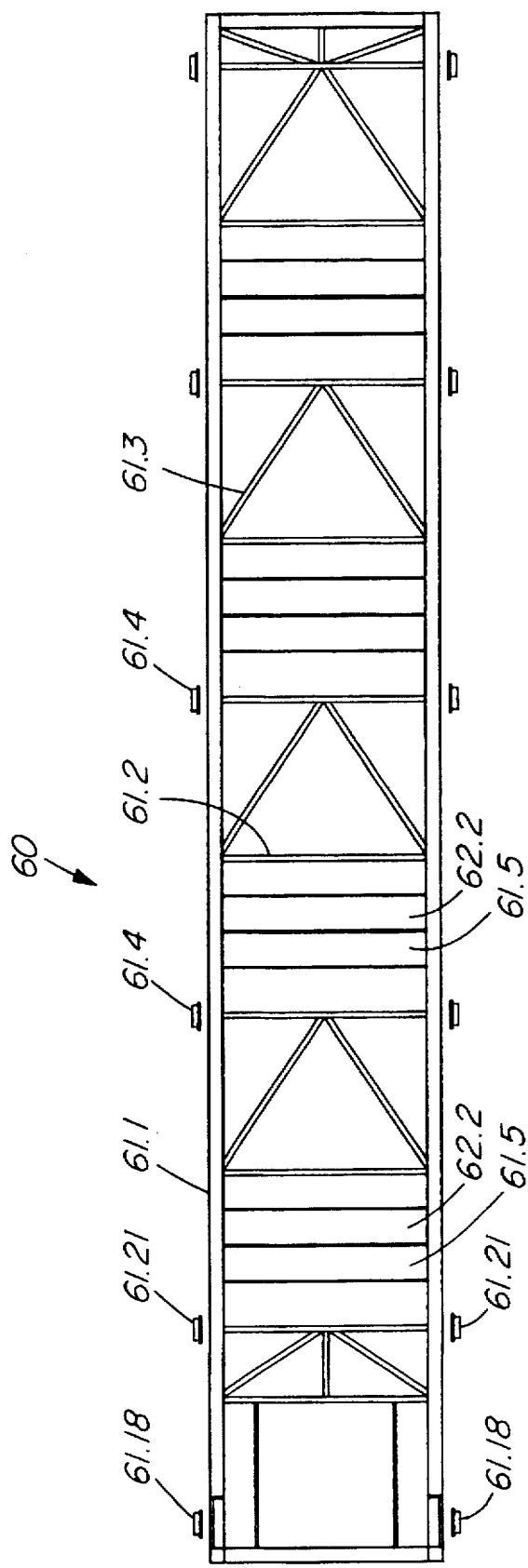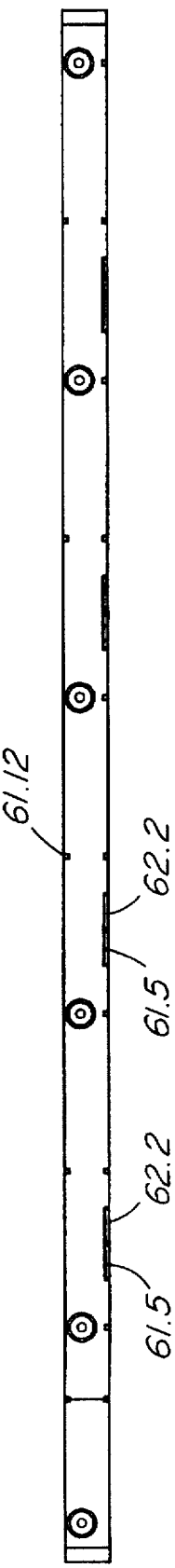
FIG. 10C
FIG. 10D

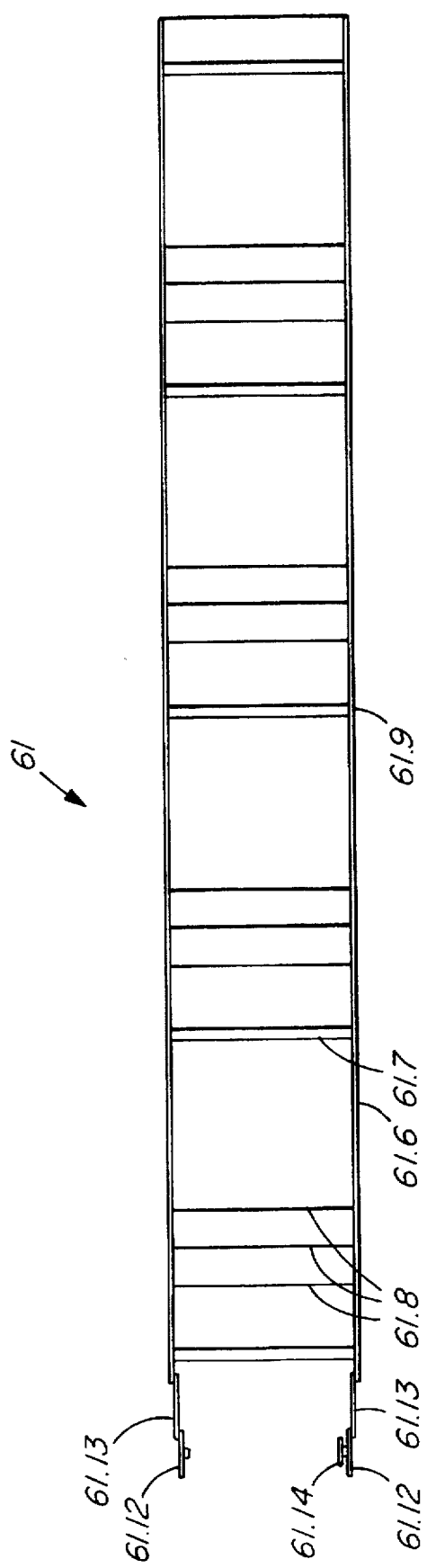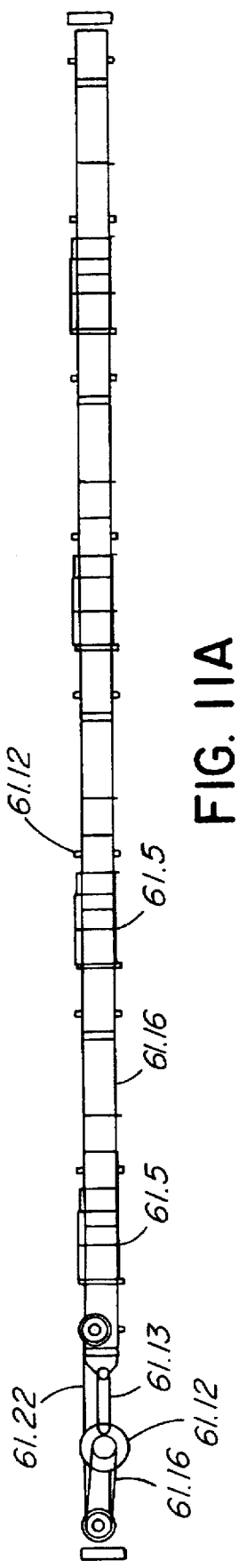

MATERIALS HANDLING SYSTEM

CROSS REFERENCE TO RELATED APPLICATION

This application is a continuation-in-part of U.S. patent application Ser. No. 08/759,931 filed Dec. 4, 1996, which is a continuation of Ser. No. 08/414,027 filed Mar. 31, 1995, now abandoned the entire contents of which are incorporated herein by reference.

FIELD OF THE INVENTION

This invention relates to a materials handling system. In particular, it relates to a system which can be used in conjunction with a tunnel conveyor for the discharge of bulk materials stored in in-line storage hoppers or in open stockpiles.

BACKGROUND OF THE INVENTION

Storage hoppers are provided with gates for the discharge of material therefrom, normally onto a conveyor belt located below the hopper. In a typical installation, a plurality of in-line hoppers are provided with a conveyor belt running along a tunnel beneath the hoppers. Such a tunnel conveyor then transports the material discharged from the hoppers to a desired location.

Most gates are installed in hoppers by using hog backs in order to narrow the opening to a controllable size, typically 4 ft×4 ft. These are fixed gates which are opened and closed manually to permit material discharge onto the belt conveyor. Hang up of material is very common and vibrators must be used to relieve plugged materials.

The gates do not permit accurate metering or control of discharge rates. This results in material surges and flooding of the conveyor belts and considerable dust emission.

It is accordingly an object of the present invention to alleviate the above-mentioned difficulties.

SUMMARY OF THE INVENTION

According to the invention there is provided a materials handling system for controlling the gravity discharge of material through a discharge opening onto a conveyor, which discharge opening has a width dimension and a length dimension in the horizontal direction, the system comprising: a gate extending across said discharge opening and having a plurality of outlet openings therein for the through flow of material from the discharge opening through the gate and including closure members for said outlet openings; first and second linkage members extending along said gate and a power source for moving the linkage members relative to the gate and independently of each other; and coupling means for selectively coupling the closure members to either one or the other of said linkage members.

Also according to the invention there is provided a materials handling system for controlling the gravity discharge of material through a discharge opening onto a conveyor, which discharge opening has a width dimension and a length dimension in the horizontal direction, the system comprising a gate extending across said discharge opening and having a plurality of outlet openings therein for the through flow of material from the discharge opening through the gate and including closure members for said outlet openings; a feeder deck below the gate having a materials receiving surface corresponding with each outlet opening; and a scraper for each materials receiving surface for moving material along the surface to discharge the material onto said conveyor.

Further objects and advantages of the invention will become apparent from the description of a preferred embodiment of the invention below.

BRIEF DESCRIPTION OF THE DRAWINGS

The invention will now be described, by way of examples, with reference to the accompanying drawings in which:

FIG. 5A is a side view of a gate of the system of FIG. 1;

FIG. 5B is a plan view of the gate of FIG. 5A;

FIG. 7A is a plan view showing a plurality of the closure plate units of FIG. 6A arranged on linkage bars to form a closure plate assembly;

FIG. 7B is a side view of the closure plate assembly of FIG. 7A;

FIG. 9A is a side view of feeder deck and scraper plate assembly a of the system of FIG. 1, shown in position on a supporting pair of rails;

FIG. 9B is a plan view of the feeder deck and scraper plate assembly of FIG. 9A;

FIG. 9C is a side view of feeder deck and scraper plate assembly according to another embodiment of the invention;

FIG. 9D is a plan view of the feeder deck and scraper plate assembly of FIG. 9C;

FIG. 10A is a side view of the feeder deck of FIG. 9A;

FIG. 10B is a plan view of the feeder deck of FIG. 10A;

FIG. 10C is a plan view of a feeder deck similar to FIG. 10A, but incorporating a reciprocating stone box;

FIG. 10D is a side view of the feeder deck of FIG. 10C;

FIG. 11A is a side view of the scraper plate assembly of FIG. 9A;

FIG. 11B is a plan view of the scraper plate assembly of FIG. 11A;

DETAILED DESCRIPTION OF PREFERRED EMBODIMENTS

Figure 1:
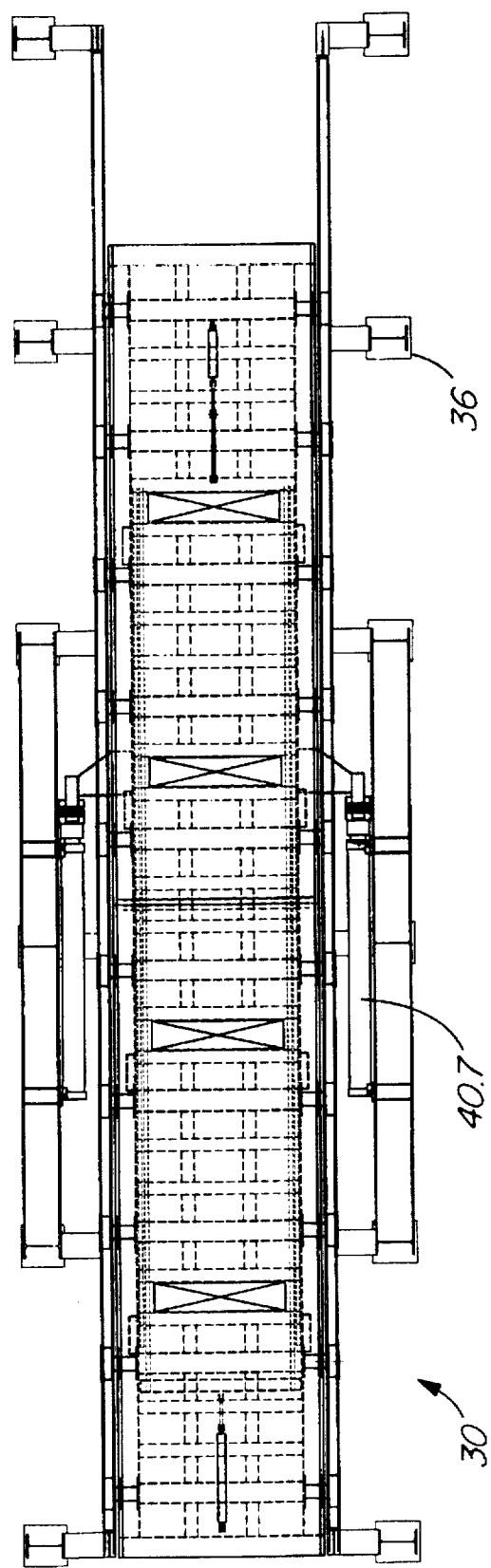
FIG. 1 is a plan view of a materials handling system according to the invention.
Figure 2:
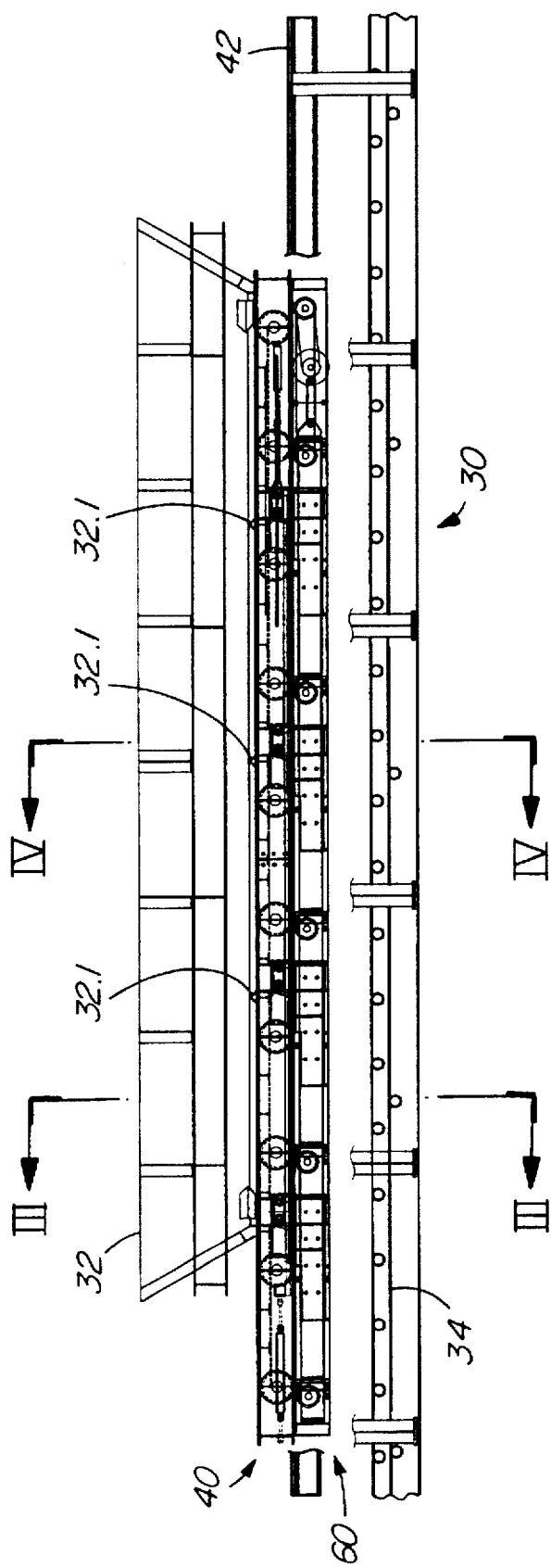
FIG. 2 is a side view of the system of FIG. 1

With reference to FIGS. 1 to 4 of the drawings, reference numeral 30 generally indicates a material handling system according to the invention. The system 30 can be used in conjunction with a plurality of in-line storage hoppers (only one hopper 32 being shown in FIGS. 3 and 4) and beneath which hoppers 32 a tunnel conveyor belt 34 extends for conveying the material discharged from the hoppers 32. Each hopper 32 has a discharge opening 33 at its lower end. The hoppers 32 are supported on columns 36 or other convenient structures.

In one embodiment, the system 30 comprises a gate 40 for each storage hopper 32 and a feeder deck 60 which is located below the gates 40 and with the ability to travel from one gate 40 to another along a rail 42 which extends along the bottom of the hoppers 32.

As shown in FIGS. 5A and B, each gate 40 comprises an elongate framework 40.1 which is supported below its respective hopper 32 on the track 42. The framework 40.1 is provided with transverse and longitudinal stiffening members 40.2 and a number of pairs of transverse members 40.3 defining a series of gate openings or slots 40.4 therebetween. In the present example there are four slots 40.4 in the gate 40. Plates 40.5 are provided on the framework 40.1 to cover the framework 40.1 leaving only the gate openings 40.4 unobscured. The gate 40 has a plurality of wheels 40.6 for running along the track 42.

Figure 3:
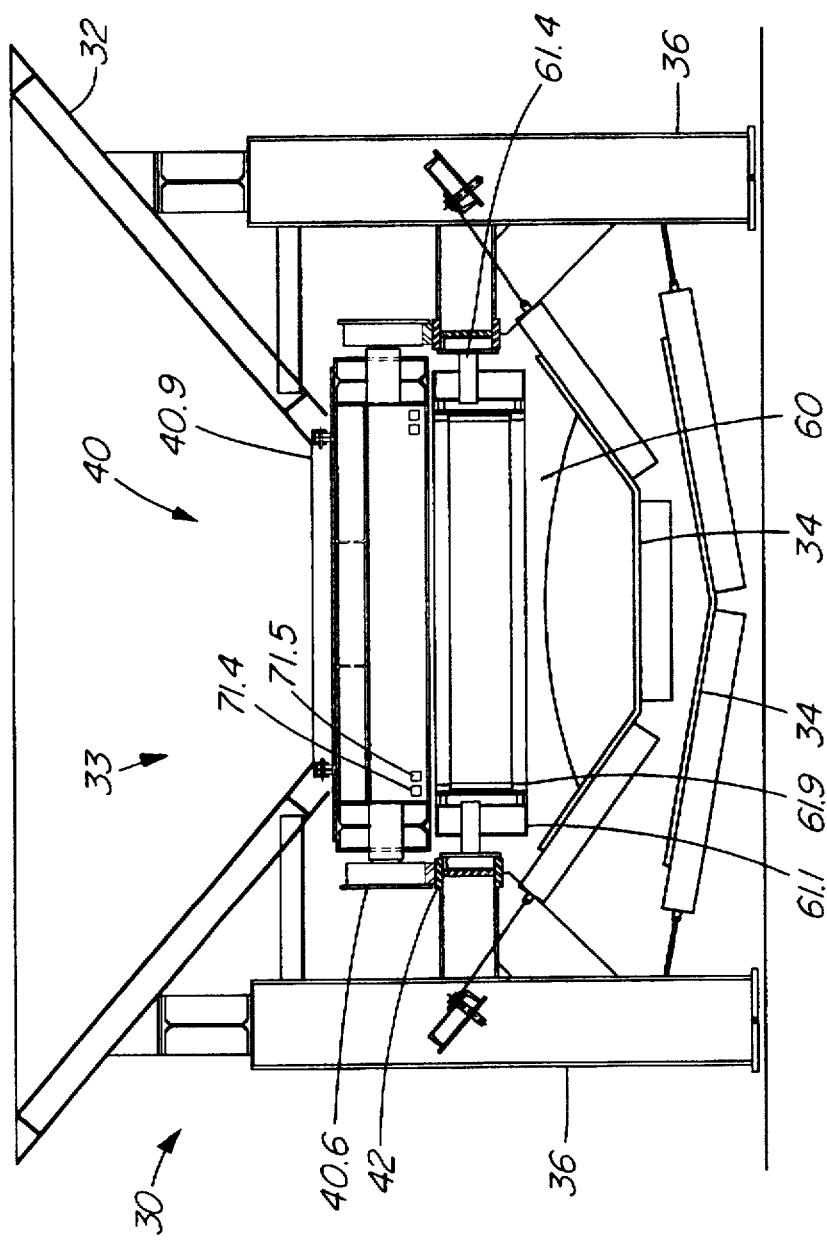
FIG. 3 is a section taken along the lines III—III in FIG. 2.
Figure 4:
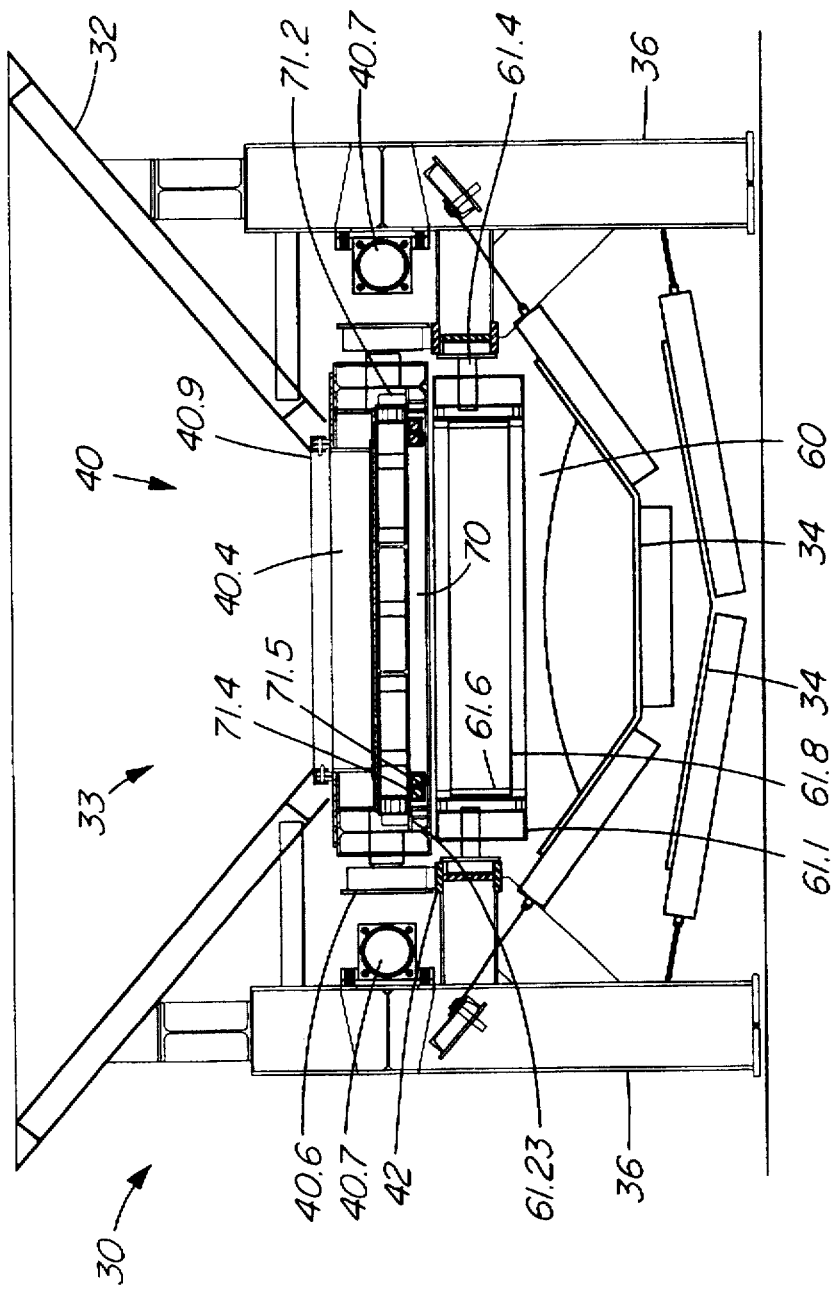
FIG. 4 is a section taken along the lines IV—IV in FIG. 2.

The gate 40 is movable in its longitudinal direction relative to the hopper discharge opening 33. In this way, the location of the gate openings 40.4 can be moved along the hopper discharge opening 33 to counteract hang up of material in the hopper 32, as will be described below. The movement of the gate 40 in either direction is effected through a pair of hydraulic cylinders 40.7 located on opposite sides of the gate 40. The cylinders 40.7 are connected to the columns 36 at their one end and to the gate 40, at their other end, through stiffeners 40.8. Material is prevented from flowing between the hopper outlet 33 and the gate 40 by seals 40.9 provided around the hopper outlet opening 33, as shown in FIGS. 3 and 4.

A closure plate assembly 70, as shown in FIGS. 7A and B, is provided for each gate 40. The assembly 70 comprises a plurality of closure plate units 71, one for each of the slots 40.4 in the gate 40.

The units 71 are in association with two pairs of linkage bars, an inner pair being referenced 71.5 and an outer pair being referenced 71.4. The units 71 are provided with guides 71.10 through which the bars 71.5, 71.4 extend so that the bars 71.5, 71.4 can be moved relative to the units 71 by sliding movement in the guides 71.10. Bolts 71.8 which extend into the guides 71.10 are provided so that each unit 71 can be selectively fastened to either one of the two pairs of linkage bars 71.5, 71.4.

A pair of opposing hydraulic cylinders 71.7 and 71.6, which are operative between the gate framework 40.1 and the pairs of linkage bars 71.5 and 71.4, respectively, are provided. Thus, the cylinder 71.7 operates to move the inner pair 71.5 longitudinally of the gate 40 and the cylinder 71.6 operates to move the outer pair of bars 71.4.

Figure 6C:
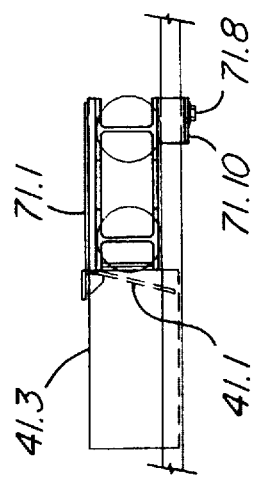
FIG. 6C is a side view of the closure plate unit of FIG. 6A.
Figure 6A:
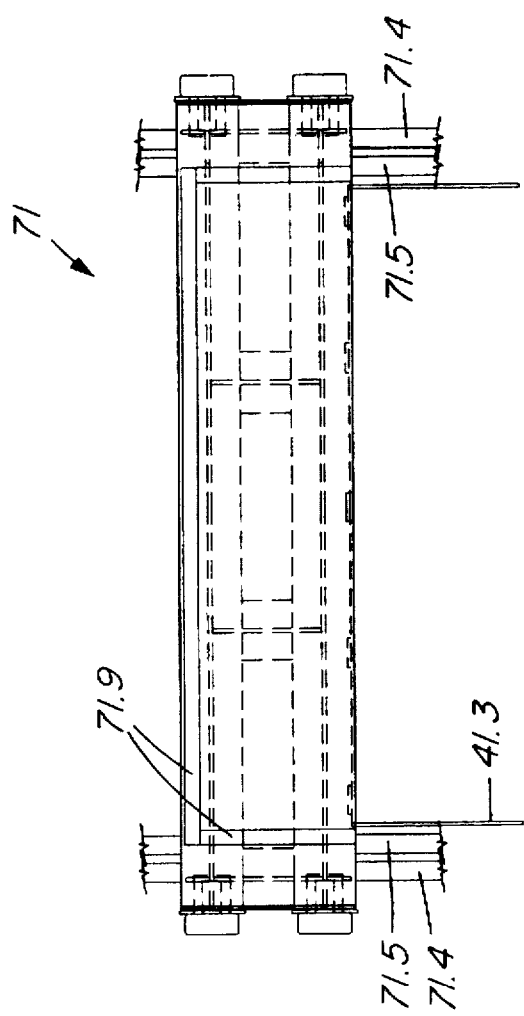
FIG. 6A is a plan view of a closure plate unit of the gate of FIG. 5A.
Figure 6B:
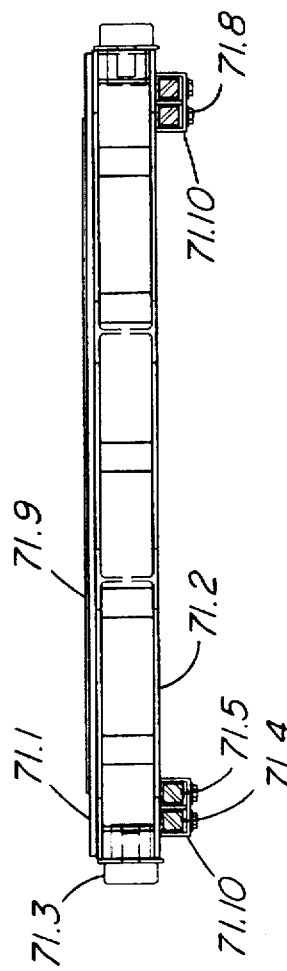
FIG. 6B is an end view of the closure plate unit of FIG. 6A.
Figure 6F:
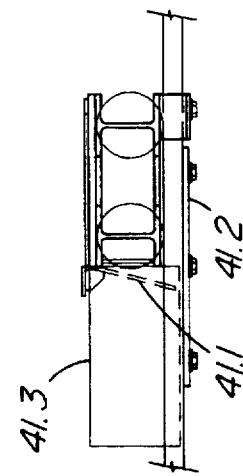
FIG. 6F is a side view of the closure plate unit of FIG. 6D.

As shown in FIGS. 6A, B and C, each of the closure plate units 71 comprises a cover plate 71.1 located on a framework 71.2. The framework 71.2 is supported by cam followers or rollers 71.3 which travel along a track 61.23 provided along the opposite inner sides of the gate framework 40.1.

Sealing strips 71.9 are provided on the cover plate 71.1 to counteract the flow of material through the respective slot 40.4 when the cover plate 71 is closed.

Each closure plate unit 71 is provided with a U-shaped retainer plate 41.3, which is attached to the unit 71, and a retainer plate 41.1, which is attached to the underside of the gate 40.

Figure 8A:
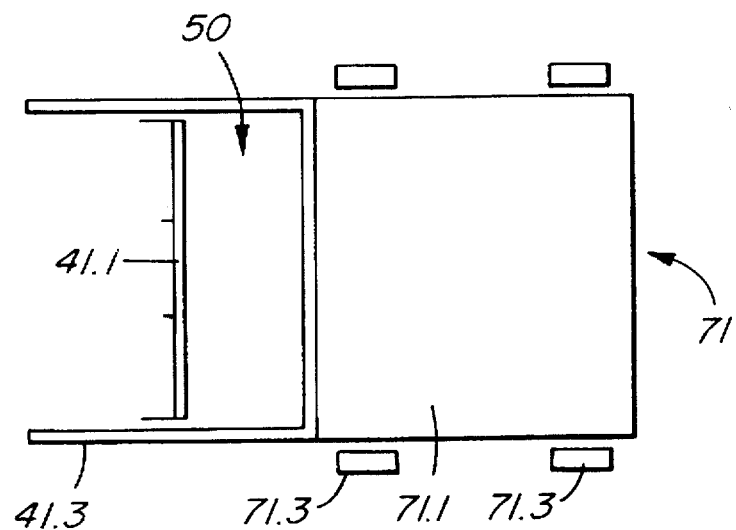
FIG. 8A is a schematical plan view of a closure plate unit shown in a half open position.
Figure 8B:
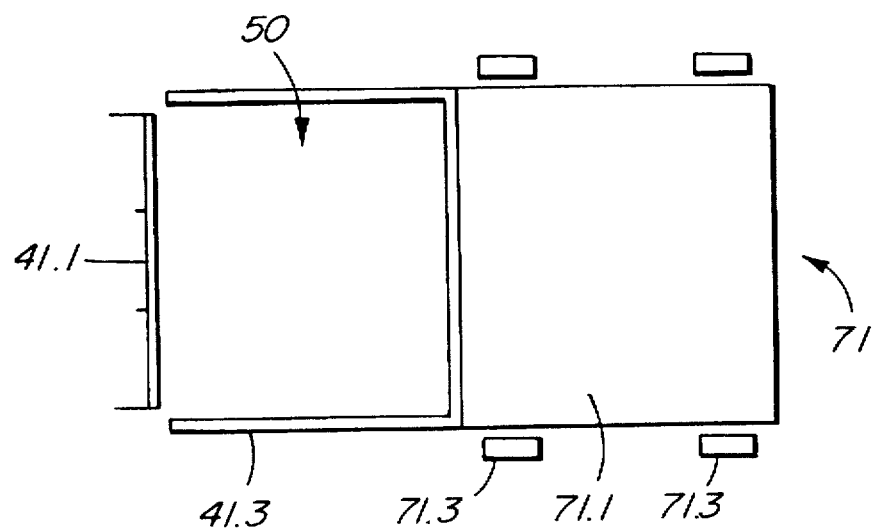
FIG. 8B is a schematical plan view of the closure plate unit of FIG. 8A shown in a fully open position.

As shown in FIGS. 8A and B, the arrangement is such that the opening, indicated by reference numeral 50, provided by the closure unit 71, when in a fully or partially open position under the corresponding gate opening 40.4, is surrounded by the plates 41.1 and 41.3. As can be seen, these plates form a rectangular framework or box around the opening 50. (The closure plate unit 71 shown in FIGS. 8A and B has a square shape, whereas the embodiment of the unit 71 shown in FIGS. 6A and 7A is of elongate shape in plan view).

As shown in FIGS. 9A and B and 10A and B, the feeder deck 60 comprises an outer framework 61.1 which is stiffened internally by perpendicular bracing 61.2 and diagonal bracing 61.3. The framework 61.1 is supported by wheels 61.4 which also run on the track 42. As can be seen from FIGS. 3 and 4, the wheels 40.6 of the gate 40 run on an upper part of the track 42, while the wheels 61.4 run along a lower part of the track 42.

The deck 60 is provided with a plurality of transverse material receiving surfaces or trays 61.5 equal in number with the slots 40.4 in the gate 40. The arrangement is such that, when the deck 60 is in position beneath one of the gates 40, the trays 61.5 are located beneath the slots 40.4 in the gate 40, so as to receive the material falling through the slots 40.4.

A scraper bar assembly 61 is provided for the feeder deck 60. As shown in FIGS 11A and B, it comprises a pair of elongate plates 61.6 with transverse bracing members 61.7 extending between the plates 61.6. A set of three transverse scraper bars or plates 61.8 extending between the plates 61.6 are provided for each tray 61.5 and located above the tray 61.5. As shown in FIG. 9B, the plates 61.6 extend along the length of the feeder deck 60 and are slidable relative thereto.

The plates 61.6 are connected through links 61.13 to cranks 61.12 which are located on the opposite ends of a drive shaft 61.11 driven by a drive 61.10. Rotation of the drive shaft 61.11 results in reciprocating movement of the plates 61.6 and hence the scraper plates 61.6 relative to the trays 61.5.

The plates 61.6 are supported by cam followers or rollers 61.9 which are engaged with and movable along the framework 61.1.

The shaft 61.11 also drives a pair of sprockets 61.14 and 61.15 which are interconnected by a chain 61.16. The sprocket 61.15 in turn drives a shaft 61.17 on which is located wheels 61.18 and sprockets 61.19. The sprockets 61.19 are connected to sprockets 61.20 and wheels 61.21 by chains 61.22. The driven wheels 61.18 and 61.21 are used to move the feeder deck 60 from one gate 40 to another. A clutch mechanism 61.23 is used to engage the sprocket 61.15 to the shaft 61.17 to effect the movement of feeder deck 60.

Each gate 40 is provided with locking pins 40.10 to lock the gate 40 to the deck 60.

In an alternative embodiment of the invention, the feeder deck 60, instead of having only the trays 61.5, is provided with a plate 62.2 adjacent each tray, as shown in FIG. 10C, so that the material receiving surface now comprises both the tray 61.5 and the plate 62.2.

Instead of three scraper plates 61.8 for each tray 61.5, only one scraper plate is provided for each tray 61.5. In this embodiment, when material falls onto the plate 62.2, the area above the plate 62.2 is filled with material, thus providing a constant cross section of material. Relative reciprocating motion of the scraper bar 61.8 to the plate 62.2 will push material further down the plate 62.2 until consecutive reciprocating motions eventually push the material off the plate 62.2. In this way, an even flow or fall off of material is achieved which can be controlled. This arrangement provides a stone box which is capable of reciprocating movement.

Figure 12:
FIG. 12 is a schematical cross-section through a scraper plate assembly according to another embodiment of the invention.
Figure 13:
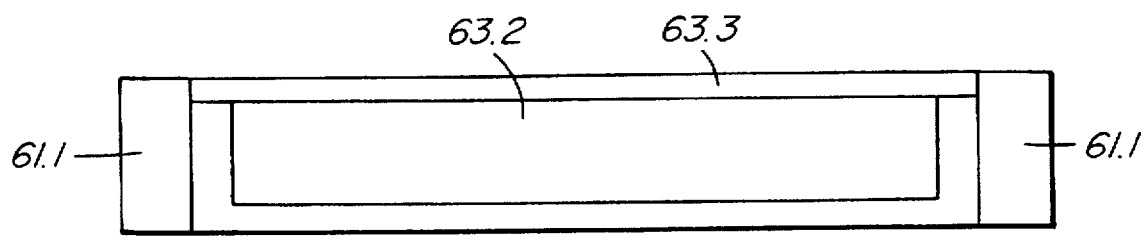
FIG. 13 is a schematical cross-sectional view of a feeder deck for use with the assembly of FIG. 12.

In another embodiment of the invention, shown in FIGS. 9C and D, the scraper plate 61.8 is replaced by a U-shaped plate 63.1 which is attached between the elongate plates 61.6, as shown more clearly in FIG. 12. In addition, a bar 63.3 is attached to the elongate framework 61.1, extending transversely thereto, as shown in FIG. 13. A scraper plate 63.2 is provided on the bar 63.3.

In operation, the U-shaped plate 63.1, which is attached to the reciprocating plates 61.6, will effect reciprocating movement relative to the plate 63.2. Therefore, material which falls through the slot 40.4 past the open closure plate unit 71 onto the U-shaped plate 63.1 will be moved along the plate 63.1 by the scraper plate 63.2, until the material is eventually pushed off the plate 63.1. Thus, again, a constant cross-section of material being moved along the plate 63.1 can be obtained.

Material which is stored in a hopper 32 is kept inside the hopper 32 by the gate 40 with the closure plate units 71 in a closed position, thus sealing off the openings 40.4 in the gate 40.

When material from a hopper 32 is to be discharged, the feeder deck 60 is moved to the hopper 32. This is achieved by activating the driven wheels 61.18 and 61.21 on the deck 60 by the drive 61.10. When the deck 60 is in position, the feeder deck trays 61.5 are located below the hopper gate openings 40.4. The deck 60 is then locked to the gate 40 by means of the locking pins 40.10.

The flow of material from the hopper 32 is controlled by the gate 40. The closure plate units 71 are opened by the linkage bars 71.4 and 71.5 connected to the cylinders 71.6 and 71.7. The two sets of linkage bars 71.4 and 71.5 allow for a variation of open slots 40.4, e.g. alternative slots 40.4 open with the others closed; or alternate slots 40.4 half open and the others fully open; or only one slot 40.4 open and the others closed; etc.

With a particular closure plate unit 71 in an open position, the material is discharged through the respective slot 40.4 onto the respective feeder deck tray 61.5. The translational motion of the scraper bars 61.8 plows or pushes the material off the deck tray 61.5. The rate of discharge of material through the gate 40 can be controlled or metered by controlling the speed of the drive 61.10.

In the event that material discharged from the hopper 32 seizes or slows due to hang ups, the gate 40 is moved relative to the discharge opening 33 by means of the hydraulic cylinders 40.7. The gate 40 and the feeder deck 60 are then moved together due to the locking pins 40.10 which are operative for locking the gate 40 and the deck 60 together. At the end of the discharge, the gate 40 is moved relative to the discharge opening 33 until material is entirely discharged. This is achieved by means of a scraper bar 32.1 on the hopper which scrapes the material off the plates 40.5 on the top of the gate 40.

After the material has been discharged from the hopper 32, the pins 40.10 are disengaged to release the feeder deck 60 from the gate 40. The feeder deck 60 can then be moved to the next hopper 32 to be discharged.

In a further alternative embodiment of the invention, the feeder deck 60 can be dispensed with and replaced by a reciprocating stone box configuration on the gate 40 so that the gate 40 now also operates as a feeder deck.

Figure 6D:
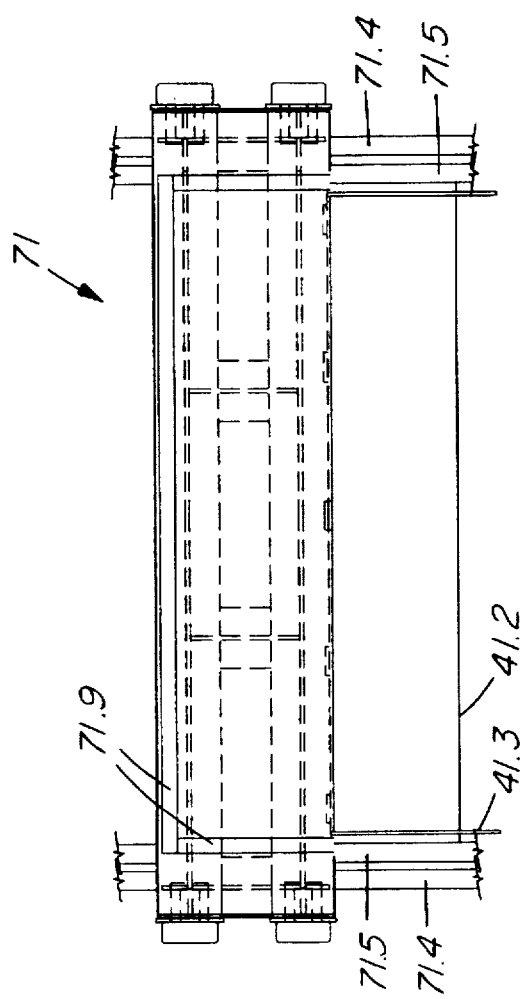
FIG. 6D is a plan view of a closure plate unit similar to FIG. 6A, but incorporating a reciprocating stone box.
Figure 6E:
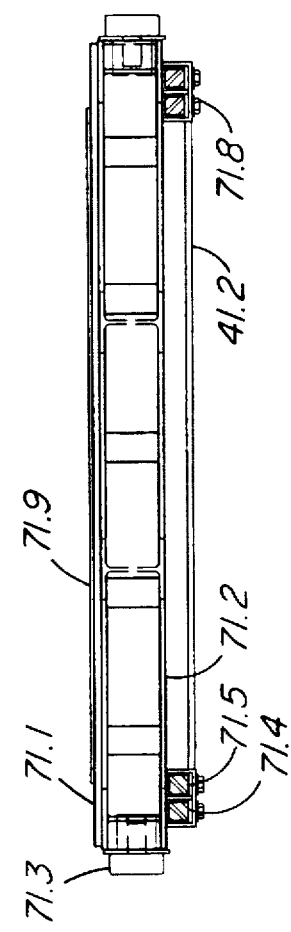
FIG. 6E is an end view of the closure plate unit of FIG. 6D.

In this arrangement, a stone box plate 41.2 is bolted to the inside pair of linkage bars 71.5 so that it extends transversely between the bars 71.5, as shown in FIGS. 6D and E. A plate 41.2 is provided for each closure plate unit 71.

Since the plates 41.2 are connected to the linkage bars 71.5, the closure plate units 71 are connected to the outer linkage bars 71.4 only. In this way, the hydraulic cylinders 71.7 will operate to reciprocate the plates 41.2 relative to the backs of the U-shaped plates 41.3, which will now act as scraper plates to produce the reciprocating stone box effect, while the hydraulic cylinder 71.6 will operate to move the closure plate units 71 relative to the slots 40.4 for controlling the through flow of material.

The U-shaped plate 41.3 will guide material parallel to the belt 34 below. Consecutive reciprocating motions of the plates 41.2 will eventually push the material off the plate 41.2. Again, a constant cross-section of material is obtained with an even fall off which can be controlled.

Figure 14:
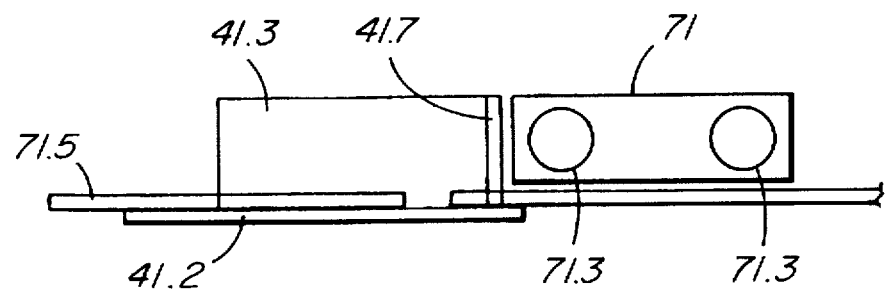
FIG. 14 is a schematic part sectional side view of part of a gate and closure plate unit according to another embodiment of the invention.

In another alternative embodiment, the plate 41.1 can be dispensed with and the back of the U-shaped plate 41.3 which is attached to the closure plate unit 71, takes the place of a scraper plate. This arrangement is shown in FIG. 14, in which the back portion of the plate 41.3 is referenced 41.7.

In yet another embodiment the gate 40 may be used on its own without the reciprocating stone box configuration. In this embodiment, use is made of selective attachment of the closure plate units 71 to either one or the other pair of linkage bars 71.4, 71.5.

The advantage of these embodiments without the separate feeder deck 60 is that any one of the in-line hoppers 32 can be discharged as desired without the need to move the deck 60 to the hopper 32. It is also possible to discharge two or more hoppers 32 at the same time.

The gates 40 and feeder decks 60 may be provided in modular units for attachment to each other to fit different sizes of hopper openings 33.

Some applications of the system 30 will now be described with reference to FIGS. 15–19. Parts which correspond with parts shown in FIGS. 1–14 are given the same reference numerals. These applications are described with reference to a system which includes a feeder deck 60.

Figure 15:
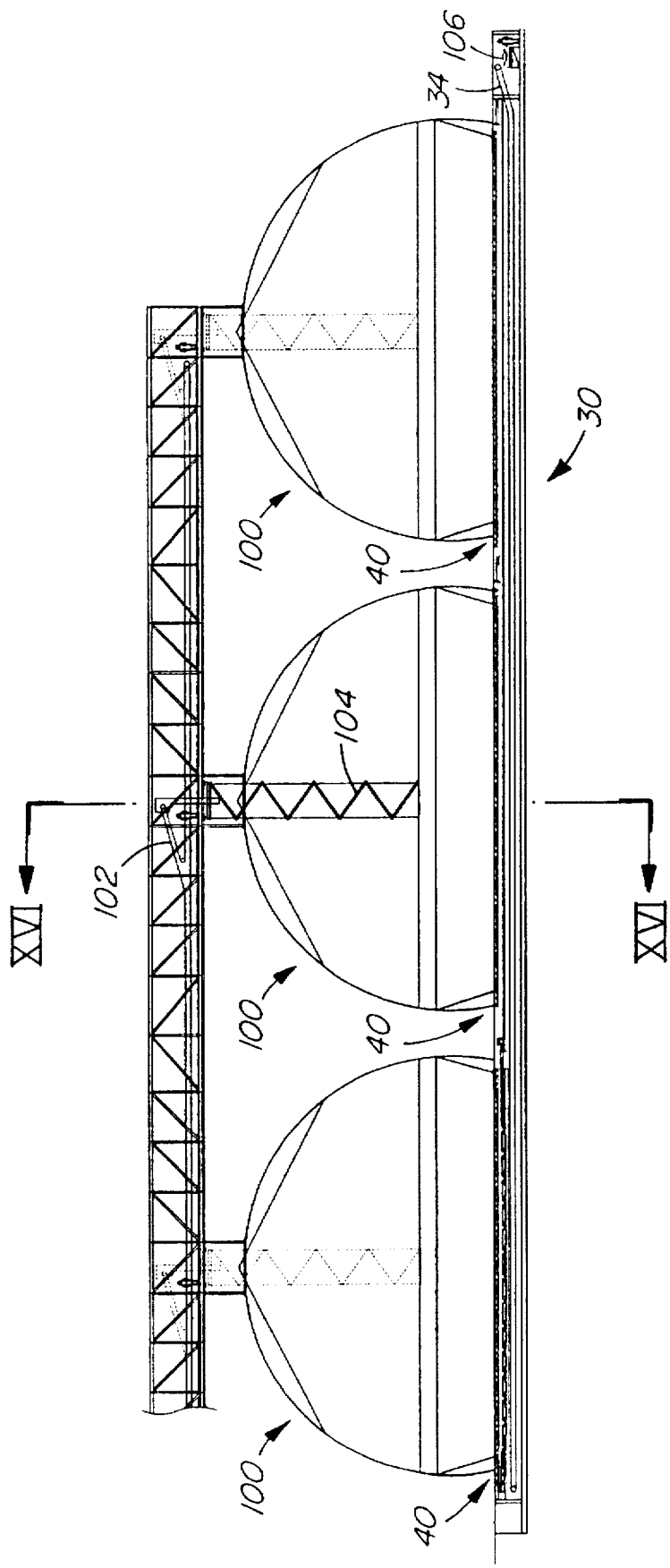
FIG. 15 is a side view showing an application of the materials handling system with multiple domes.
Figure 16:
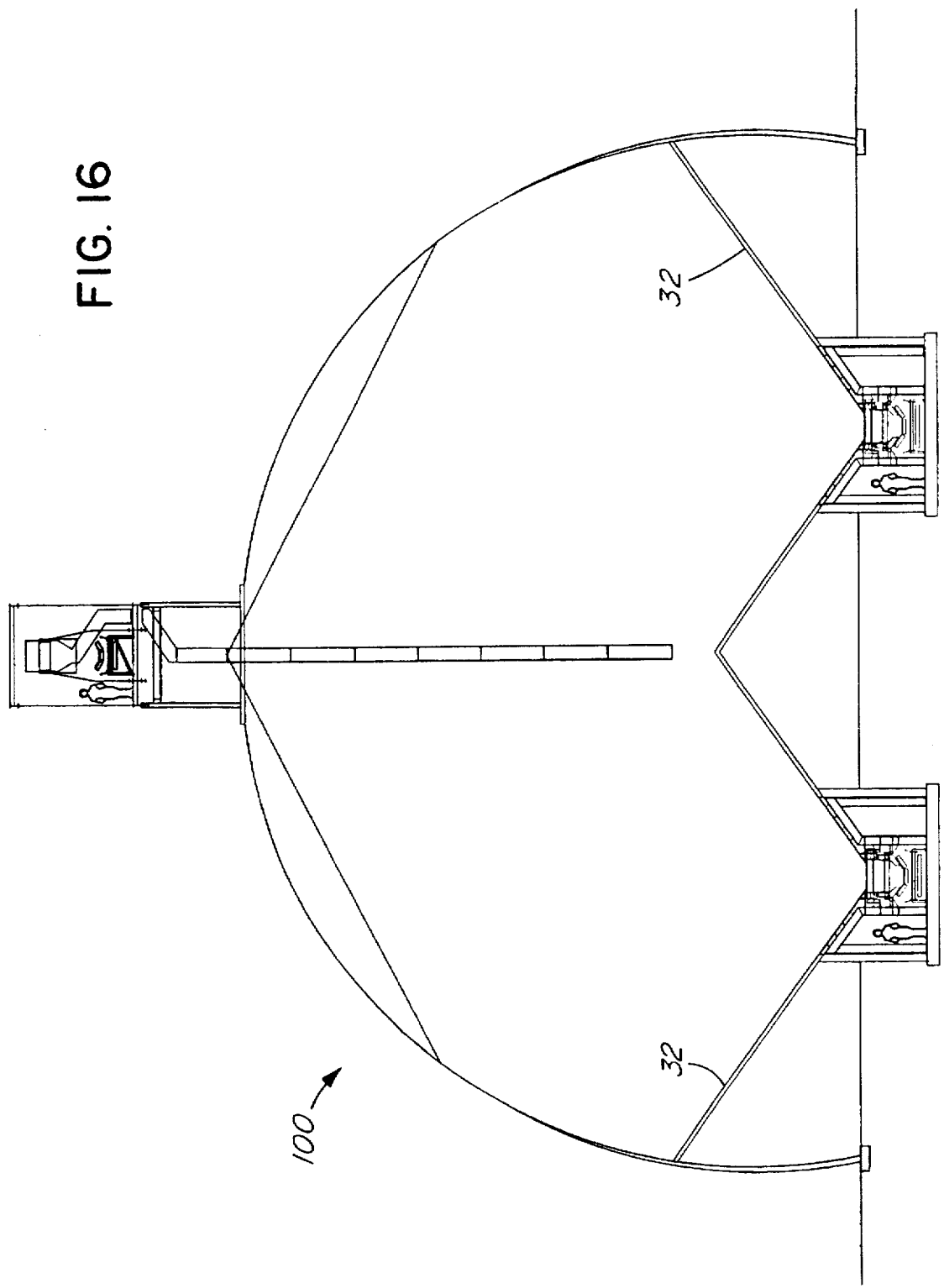
FIG. 16 is a section taken along the lines XVI—XVI in FIG. 15.

In FIGS. 15 and 16, a typical application with multiple in-line domes 100 is shown. As shown in FIG. 16, the lower part of each dome 100 is formed into two side by side hoppers 32. The system 30 is installed with respect to each of the hoppers 32. Thus, in this application, two of the systems 30 are located side by side, each provided with a respective tunnel conveyor 34.

In FIG. 15, reference numerals 102 and 104, respectively, indicate a tripper conveyor and a telescoping asymmetrical soft loading chute for loading materials into domes 100. Reference numeral 106 indicates a transfer conveyor for receiving material from tunnel conveyors 34.

The track 42 of each system 30 runs along the bottom of all the domes 100. Thus, by movement of the feeder deck 60 along the track 42 to the gate 40 of a required dome 100, material discharge from any one of the domes 100 can be effected as desired.

Figure 17:
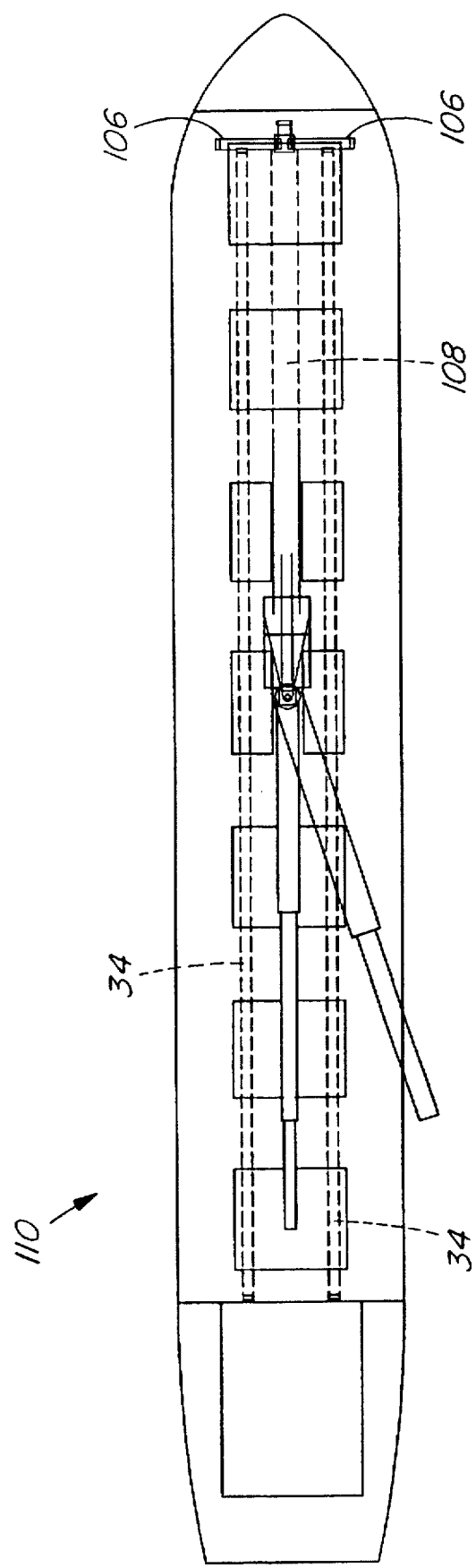
FIG. 17 is a plan view of a self-unloading ship provided with a materials handling system according to the invention.
Figure 18:
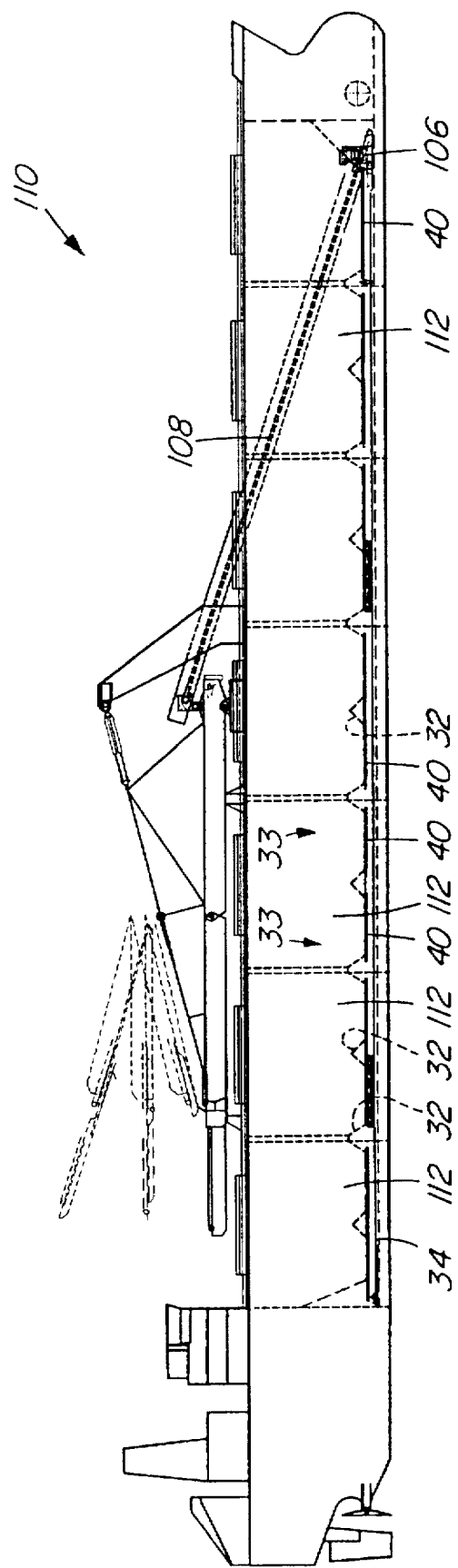
FIG. 18 is a side view of the ship of FIG. 17.
Figure 19:
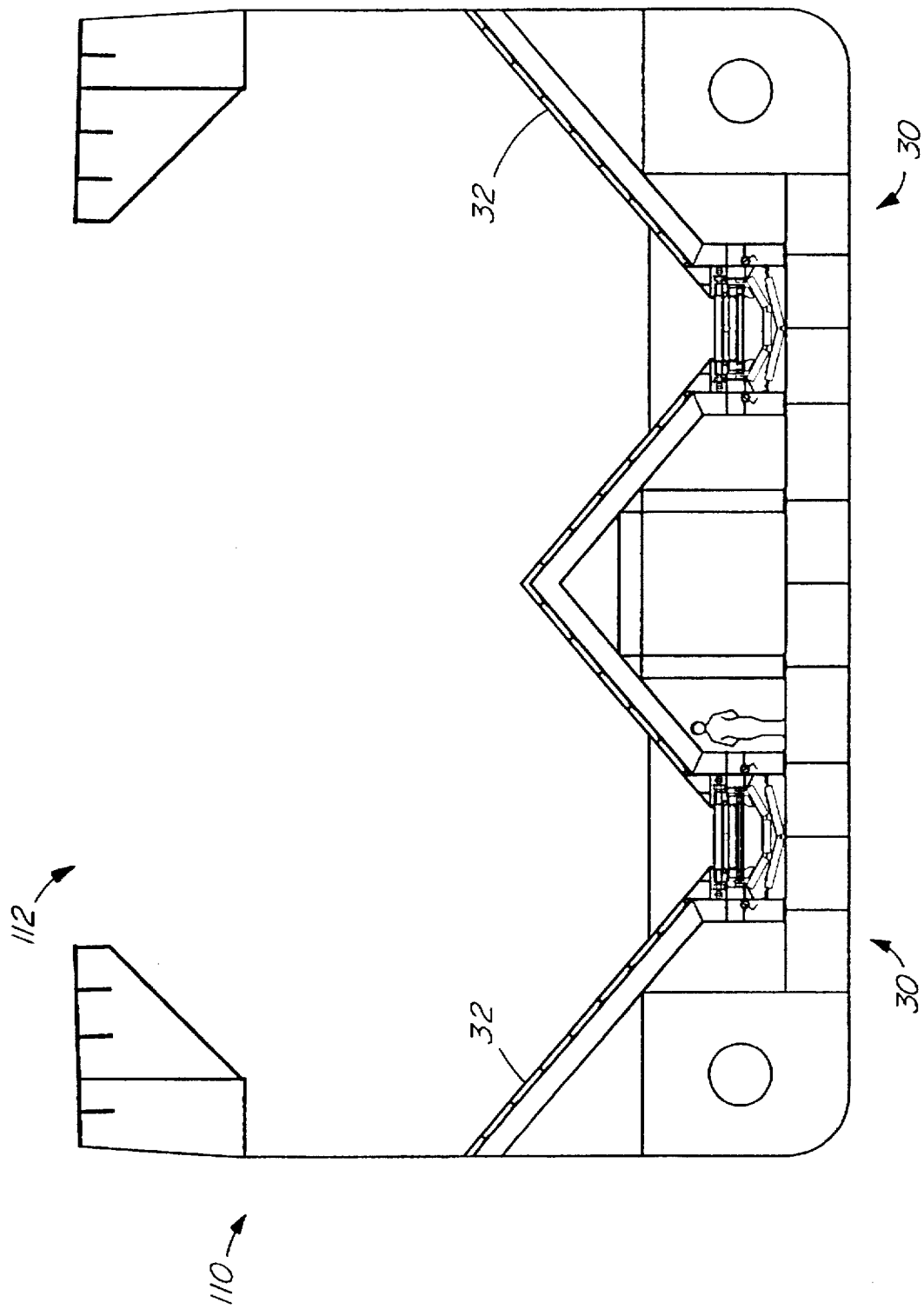
FIG. 19 is a cross-section through the hold of the ship of FIG. 17.

In FIGS. 17-19, an application of the system 30 in a self-unloading ship 110 is shown. The ship 110 has seven separate holds 112, the lower parts of which are shaped to form two side-by-side hoppers 32, as shown in FIG. 19. Thus, there are again two of the systems 30 installed side-by-side.

As can be seen in FIG. 17, there is one tunnel conveyor 34 on the starboard side of the ship 110 and one tunnel conveyor 34 on the port side. There is also a transfer conveyor 106 on the starboard side and a transfer conveyor 106 on the port side.

The track 42 of each system 30 runs along the length of the ship 110 past all the gates 40 of the holds 112. Thus, in this application again material from any one of the holds 112 can be discharged and unloaded by movement of the feeder deck 60 to the gate 40 or one of the longitudinally spaced gates 40 of any one of the holds 112, as desired.

Reference numeral 108 refers to an incline conveyor which receives material from the transfer conveyors 106 for transporting the material to the outside for unloading purposes.

While only preferred embodiments of the invention have been described herein detail, the invention is not limited thereby and modifications can be made within the scope of the attached claims.

We claim:

1. A materials handling system for controlling the gravity discharge of material through a discharge opening onto a conveyor, which discharge opening has a width dimension and a length dimension in the horizontal direction, the system comprising:

a gate extending across said discharge opening and having a plurality of outlet openings therein for the through flow of material from the discharge opening through the gate and including closure members for said outlet openings;

first and second linkage members extending along said gate and a power source for moving the linkage members relative to the gate and independently of each other; and coupling means for selectively coupling the closure members to either one or the other of said linkage members.

2. The materials handling system according to claim 1, wherein said first and second linkage members each comprises a pair of linkage bars and the closure members are provided with guides for receiving the linkage bars therethrough.

3. The materials handling system according to claim 2, wherein said coupling means comprises fasteners for fastening said guides onto said linkage bars.

4. A materials handling system for controlling the gravity discharge of material through a discharge opening onto a conveyor, which discharge opening has a width dimension and a length dimension in the horizontal direction, the system comprising:

a gate extending across said discharge opening and having a plurality of outlet openings therein for the through flow of material from the discharge opening through the gate and including closure members for said outlet openings;

a feeder deck below the gate having a materials receiving surface corresponding with each outlet opening; and a scraper for each materials receiving surface for moving material along the surface to discharge the material onto said conveyor.

5. The materials handling system according to claim 4, further comprising a guide for guiding movement of said gate in a direction along the length of said discharge opening; and a power source for moving the gate along said guide for relocating the outlet openings of the gate along the length of the discharge opening.

6. The materials handling system according to claim 4, further comprising moving means for moving at least one of said closure members independently of another one of said closure members.

7. The materials handling system according to claim 6, wherein said moving means comprises at least two independently movable members, and connection means for connecting the closure members to either one or the other of said independently movable members.

8. The materials handling system according to claim 7, wherein said independently movable members extend along the gate and including a power source for moving each of said movable members relative to the gate.

9. The materials handling system according to claim 8, wherein said independently movable members each comprise a pair of linkage bars and the closure members are provided with guides for receiving the linkage bars therethrough.

10. The materials handling system according to claim 9, wherein said coupling means comprises fasteners for fastening said guides onto said linkage bars.

11. The materials handling system according to claim 4, further comprising means for effecting relative reciprocating movement between said materials receiving surfaces and said scrapers for effecting the movement of material along the surfaces.

12. The materials handling system according to claim 4, wherein said materials receiving surfaces of the feeder deck are located on said gate.

13. The materials handling system according to claim 12, wherein said scrapers are attached to said closure members and wherein one of said materials receiving surfaces is provided adjacent and below each of said closure members and mounted for movement relative to the closure member.

14. The materials handling system according to claim 13, further comprising a box formation confining the opposite sides of each of said materials receiving surfaces to produce a constant cross-section of material being moved along the surface by said relative reciprocating movement between the scraper and the surface.

15. The materials handling system according to claim 4, for controlling the gravity discharge of material through a plurality of laterally spaced discharge openings, comprising one of said gates for each discharge opening, said feeder deck being selectively movable between said discharge openings and further comprising a power source for moving said feeder deck between said discharge openings.

16. The materials handling system according to claim 15, wherein said scrapers for the materials receiving surfaces are mounted on the feeder deck for reciprocating movement relative to the materials receiving surfaces for effecting the movement of material along the surfaces.

17. The materials handling system according to claim 16, further comprising a box formation confining the opposite ends of each of said materials receiving surfaces to produce a constant cross-section of material being moved along the surface by said relative reciprocating movement between the scraper and the surface.

18. The materials handling system according to claim 17, wherein said discharge openings are the discharge openings of a plurality of in-line hoppers.

19. The materials handling system according to claim 18, wherein said discharge openings are the discharge openings of a plurality of in-line holds on a self-unloading ship.

20. A self-unloading ship provided with a materials handling system according to claim 19.

\* \* \* \* \*